Feb. 22, 1949.                  H. A. ENGLE                    2,462,371
            CONTROL APPARATUS FOR PERIODICALLY ENERGIZING
                        GASEOUS DISCHARGE DEVICES
                         Filed March 19, 1947
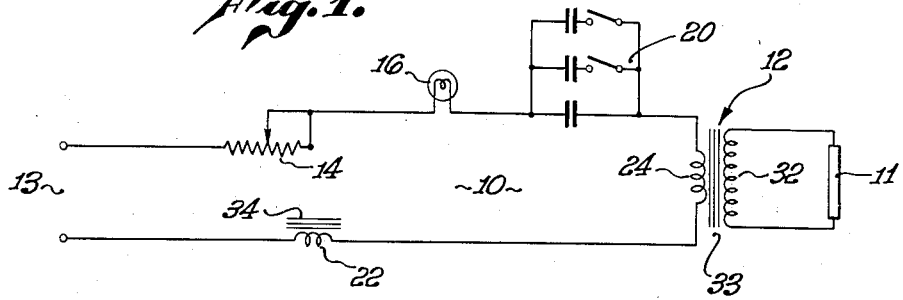
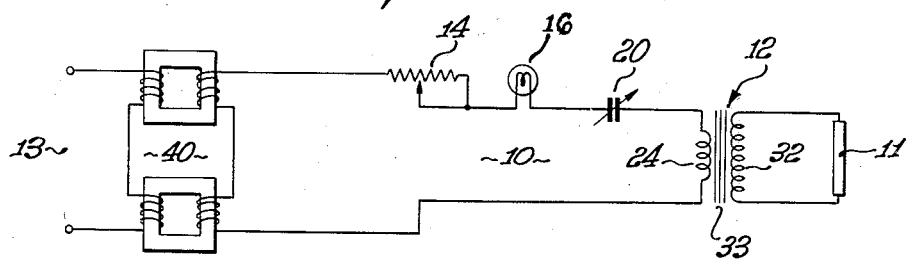
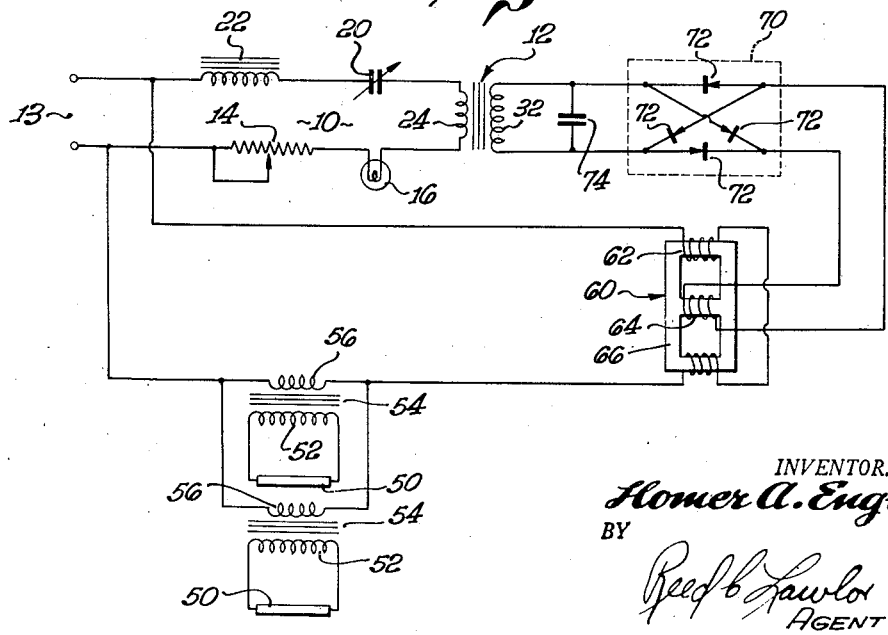
INVENTOR.
Homer A. Engle
BY
Reed C. Lawlor
AGENT Patented Feb. 22, 1949

2,462,371

UNITED STATES PATENT OFFICE 2,462,371

CONTROL APPARATUS FOR PERIODICALLY ENERGIZING GASEOUS DISCHARGE DEVICES

Homer A. Engle, Los Angeles, Calif.

Application March 19, 1947, Serial No. 735,689

10 Claims. (Cl. 315—276)

My invention relates to alternating current control apparatus of a type which serves to energize a load periodically at low frequency. More particularly, my invention relates to improved control apparatus for periodically energizing "neon-type" gaseous discharge devices.

One object of my invention is to provide an improved alternating current control apparatus which serves to vary the power supplied to a load periodically without employing contacts which make and break. Another object of my invention is to provide an improved control apparatus of that type for periodically exciting a "neon-type" gaseous discharge device.

In accordance with my invention, I employ a self-modulating resonant circuit which includes an inductance coil wound on an unsaturated ferromagnetic core and which also includes a thermally variable impedance element which cooperates with that inductance coil for modulating the current which flows in the resonant circuit when the resonant circuit is connected to a source of A. C. (alternating current) potentials. In one preferred embodiment of the invention a load circuit which is to be controlled is inductively coupled with that inductance coil and the amount of power supplied to this load circuit varies in accordance with the amplitude of the current flowing in the resonant circuit. In another preferred embodiment of the invention, the modulated alternating current flowing in the resonant circuit is rectified and the rectified current is used to vary the saturation of a saturable reactor in order to control the flow of power to a load. In the preferred application of my invention, I employ a resonant circuit of the type described to periodically excite, or energize, "neon-type" gaseous discharge devices such as neon signs.

The foregoing and other objects of my invention, together with numerous features thereof, will be understood from the following description taken in conjunction with the accompanying drawing, wherein Figure 1 is a schematic wiring diagram of a circuit embodying my invention;

Fig. 2 is a schematic diagram of a similar circuit employing a voltage regulator at the input; and Fig. 3 is a schematic wiring diagram of another embodiment of my invention.

Referring to Fig. 1, there is illustrated a self-modulating resonant circuit 10 which serves to periodically excite a "neon-type" gaseous discharge device 11 inductively coupled therewith through a voltage step-up transformer 12. The resonant circuit 10 is provided with an input 13 to which alternating current potentials are applied from some suitable source of A. C. potentials such as a 60 cycle, 110 volt power line. With the resonant circuit 10, constant amplitude A. C. potentials supplied from the power line are converted into modulated alternating current.

The resonant circuit 10 includes a rheostat 14, a thermally variable resistor 16, an adjustable condenser 20, and a first inductance coil 22, all connected in series with a second inductance coil comprising a primary winding 24 of the transformer 12. The "neon-type" gaseous discharge device 11 is connected directly across the secondary winding 32 of the transformer 12. The variable resistor 16 is of a type having a positive temperature coefficient of resistance, that is one whose resistance increases with temperature. The core 33 of the transformer 12 is preferably composed of iron or other ferromagnetic material, the permeability of which varies with the magnetizing force to which it is subjected.

The various elements of the resonant circuit 10 cooperate to modulate the alternating current which flows in the primary winding 24 at a predetermined pulsation frequency as more fully explained hereinbelow. The modulation of the alternating current flowing in the resonant circuit arises from the joint action of the variable impedance characteristics of the thermally variable resistor 16 and the primary winding 24. The frequency of modulation depends in part upon the characteristics of the thermally variable resistor 16 and the primary winding 24 but may be varied by adjustment of the rheostat 14 or the condenser 20. By suitable adjustment of the circuit constants, the frequency of modulation can be established over a wide range of values from a few cycles per second to one cycle every few minutes.

The transformer 12 is preferably of the closed-core type which permits substantial variation of the effective inductance of the primary winding 24 as a function of the current flowing therein. In actual operation, the core is normally unmagnetized while no current is flowing in the primary winding 24 and is variably magnetized to values less than saturation when current is flowing in that winding. As a result, the permeability of the core material varies from a minimum value corresponding to low alternating currents to a maximum value corresponding to large alternating currents. These conditions are satisfied if the core is operated below the shoulder of the magnetization curve of the core material, and particularly if the peak value of the minimum alternating current magnetizes the core to less than about 20% of saturation and the peak value of the maximum alternating current magnetizes the core to about 50% to 80% of saturation. Saturation occurs above the shoulder of the magnetization curve and hence does not enter into the normal operation of this circuit.

Because the effective permeability of the core 33 varies with the amplitude of the alternating current flowing in the primary winding 24, the effective impedance of this winding is not of constant value but varies as a direct function of the amplitude of the current flowing therethrough. As a result, the resonant frequency of the resonant circuit 10 is not constant but varies in a corresponding manner. By tuning the resonant circuit 10 to a range of frequencies below the frequency applied from the power line and operating the circuit at a current below the saturation value, the circuit becomes self-modulating.

The first inductance coil 22 serves to limit the current flowing in the resonant circuit 10 at least to the extent that its presence compensates somewhat for poor regulation in the source of A. C. potentials. Thus, by including the first inductance coil 22 in series with the other elements of the resonant circuit, the frequency of modulation of the alternating current flowing in the resonant circuit is more nearly constant than it would otherwise be. For this purpose, the inductance coil 22 may be in the form of a coil wound upon an iron core 34 having a small airgap therein which operates at a substantially constant impedance throughout the entire cycle of modulation of the alternating current passing therethrough. Preferably the inductance of the inductance coil 22 is of a value intermediate the minimum and maximum values of the inductance of the primary winding 24.

In an alternative embodiment of the invention, the first inductance coil 22 is of the closed-core type designed to operate as a variable impedance device to modulate the current flowing therethrough in the same manner as the primary winding 24 described hereinabove. But in this embodiment of the invention, the core of the transformer 12 is provided with sufficient iron for the inductance of the primary winding 24 to remain substantially constant throughout the range of currents passing therethrough. However, both in this embodiment of the invention and that hereinabove described, the "neon-type" discharge lamp is coupled to the resonant circuit 10 through the voltage step-up transformer 12.

The turns-ratio of the secondary winding 32 to the primary winding 24 is high and of such value that the voltage applied to the gaseous discharge device 11 periodically exceeds the ignition voltage thereof and periodically falls below the extinction voltage. The minimum value of turns-ratio required to excite the gaseous discharge device 11 depends upon its length as is well known. A suitable turns-ratio would be one for which the gaseous discharge device is just ignited for the average alternating current flowing in the primary winding 24. With this arrangement, the gaseous discharge device 11 is periodically excited in synchronism with the modulation of the alternating current flowing in the resonant circuit. More particularly, during the intervals when the amplitude of the alternating current flowing in the resonant circuit 10 is low, the voltage applied to the gaseous discharge device 11 is insufficient to energize the gaseous discharge device and it remains dark; but when the amplitude is high, the voltage impressed upon the gaseous discharge device 11 is likewise high and maintains it energized and therefore glowing.

By the term "neon-type" gaseous discharge device, I mean to include gaseous discharge devices which operate on high voltage alternating current. As is well known, such a gaseous discharge device comprises an elongated envelope within which is sealed a gas, usually an inert gas, at low pressure. Such a gaseous discharge device includes a pair of electrodes disposed at opposite ends thereof between which current may flow in either direction thus operating bilaterally.

In Fig. 2 I have illustrated an alternative embodiment of my invention which is similar to the foregoing except that the first inductance coil 22 is omitted and a voltage regulator 40 of the self-saturating type is connected between the input 13 and the resonant circuit 10. In this case the presence of the regulator 40 limits the variation in modulation frequency that would otherwise occur with changes in power line voltage.

It is to be understood that the control circuits illustrated can be operated successfully without the aid of the auxiliary inductance coil 22 and without the aid of the regulating transformer 40, these two devices serving only to stabilize the frequency of modulation in the presence of variations in voltage applied to the input 13. The thermally variable resistor may be in the form of an incandescent lamp and is merely one example of a thermally variable impedor which may be used in the generation of the modulated alternating current. By the term "thermally variable impedor" I mean an impedance element, the impedance of which varies as a continuous function of the current passing therethrough, thus excluding from the term devices which open and close contacts in accordance with changes of current flowing therein.

In Fig. 3 I have illustrated a circuit wherein the modulated alternating current is used to control the power flowing to a large load. This circuit includes the same rheostat 14, the same thermally variable resistor 16, the same transformer 12, and the same adjustable capacitor 20 connected as hereinabove described in connection with Fig. 1. In this case, however, the load to be controlled comprises two or more "neon-type" gaseous discharge devices 50, each of which is connected across the secondary winding 52 of a corresponding load transformer 54, the primary windings 56 of which are all connected in parallel across the input 13 of the resonant circuit 10.

In this case a saturable core reactor 60 having a variable impedance winding 62 and a saturating winding 64 wound on a saturable core 66, is used to control the flow of power to the load in accordance with current variations in the resonant circuit 10. The impedance winding 62 is connected to the input 13 in series with the primary windings 56 of the load transformers 54. The impedance of the impedance winding 62 of the saturable core reactor 60 is controlled by varying the direct current flowing in the saturating winding 66 thereof in accordance with the modulation of the alternating current in the resonant circuit 10. The application of direct current to the saturating winding is accomplished by means of a full-wave bridge rectifier 70 comprising four rectifier elements 72 connected between the secondary winding 32 of the transformer 12 and the saturating winding 64.

A condenser 74 is preferably connected in parallel with the secondary winding 32 in order to tune the secondary winding to the frequency of the power line so as to generate a large current therein.

The inclusion of the first inductance coil 22 in this circuit minimizes any tendency of load variation to affect the frequency of modulation.

In the operation of this circuit, the modulated alternating current induced in the secondary winding 32 of the transformer 12 is rectified by the rectifier 70 and the rectified current flows through the saturating winding 64. With this arrangement the average direct current flowing through the saturating winding 64 varies in synchronism with the amplitude of the alternating current flowing in the resonant circuit 10 and at the frequency of modulation.

When the current flowing in the saturating winding 64 is high, the core 66 is highly saturated and the impedance of the impedance winding 62 is relatively low, thus permitting a relatively large current to flow in each of the primary windings 56 of the load transformers 54. On the other hand, when the current flowing in the saturating winding 64 is low, the core 66 is saturated to a lesser degree and the impedance of the impedance winding 62 is relatively high, thus permitting only a relatively low current to flow through the primary windings 56 of the load transformers 54.

Inasmuch as the voltage induced in the secondary winding 52 of each of the load transformers 54 is substantially proportional to the current flowing in the primary winding thereof, it is thus seen that the voltage impressed upon each of the gaseous discharge devices 50 varies periodically at the frequency of modulation of the alternating current flowing in the resonant circuit 10. By selecting the turns-ratio of the primary and secondary windings 56 and 52 of each of the transformers 54 so that the minimum voltage impressed upon each of the gaseous discharge devices 50 falls below the extinction voltage thereof and the maximum voltage exceeds the ignition voltage thereof, the gaseous discharge devices are periodically excited in synchronism with the modulation of the alternating current in the resonant circuit 10.

It is to be noted that the transformer 12 which is responsible for the modulation of the alternating current flowing in the resonant circuit is of conventional construction and operates without the aid of any magnetic bias. It is also to be noted that the saturable core reactor 60 takes no part in generating the modulated current and that this reactor is not a transformer since its two windings are not inductively coupled. Furthermore it is also to be noted that the periodic energization of the load is controlled solely in accordance with the modulation of the alternating current in the resonant circuit.

While I have described my invention as applied particularly to the periodic control of the flow of electric power to "neon-type" gaseous discharge devices, it is to be understood that my invention is also applicable to the periodic control of alternating current power to other types of loads. Having now described several forms of apparatus in which the objects of my invention are attained, what I claim as new and desire to secure by Letters of Patent is set forth in the appended claims.

I claim:

1. In combination: a transformer having a primary winding and a secondary winding arranged on a ferromagnetic core; a resonant circuit having an input adapted for connection to a source of A. C. potentials, said resonant circuit including said primary winding and a condenser; a thermally variable impedance means operatively connected with said primary winding for varying the inductance thereof whereby the current in the primary winding is modulated at a pulsation frequency lower than the frequency of said A. C. potentials; and a load circuit connected across said secondary winding and periodically energized at the pulsation frequency by the voltage induced therein from the primary winding.

2. In combination: a resonant circuit having an input adapted for connection to a source of A. C. potentials, said resonant circuit including a condenser and an inductance coil wound on an unsaturated ferromagnetic core; a thermally variable impedance means operatively connected with said inductance coil for modulating the current flowing in said resonant circuit at a pulsation frequency lower than the frequency of said A. C. potentials; and a load circuit inductively coupled with said inductance coil and controlled in accordance with the amplitude of the current flowing in said resonant circuit whereby the voltage supplied to said load circuit varies in synchronism therewith.

3. In combination: a transformer having a primary winding and a secondary winding arranged on an unsaturated ferromagnetic core; a resonant circuit having an input adapted for connection to a source of A. C. potentials, said resonant circuit including said primary winding and a condenser; a thermally variable impedance means operatively connected with said primary winding for modulating the current in the primary winding at a pulsation frequency lower than the frequency of said A. C. potentials; and a load circuit connected to said secondary winding and controlled solely by the voltage induced therein by current flowing in the primary winding whereby the voltage supplied to said load circuit varies in synchronism with amplitude of the alternating current flowing in said primary winding.

4. In combination: a resonant circuit having an input adapted for connection to a source of A. C. potentials, said resonant circuit including a condenser and an inductance coil wound on an unsaturated ferromagnetic core; a thermally variable impedance means operatively connected with said inductance coil for modulating the current flowing in said resonant circuit at a pulsation frequency lower than the frequency of said A. C. potentials; and a "neon-type" gaseous discharge device inductively coupled with said inductance coil and periodically energized at the pulsation frequency by the voltage induced therein by current flowing in the primary winding.

5. In combination: transformer having a primary winding and a secondary winding arranged on an unsaturated ferromagnetic core, the turns-ratio of said secondary and primary windings being high; a resonant circuit having an input adapted for a connection to a source of A. C. potentials, said resonant circuit including said primary winding and a condenser; a thermally variable impedance means operatively connected with said primary winding for modulating the current in the primary winding at a pulsation frequency lower than the frequency of said A. C. potentials; and a "neon-type" gaseous discharge device connected across said secondary winding and periodically energized at the pulsation frequency by the voltage induced therein by current flowing in the primary winding.

6. In combination: a first transformer having a primary winding and a secondary winding arranged on an unsaturated ferromagnetic core; a resonant circuit having an input adapted for connection to a source of A. C. potentials, said resonant circuit including said primary winding and a condenser; a thermally variable impedance means operatively connected with said primary winding for modulating the current in the primary winding at a pulsation frequency lower than the frequency of said A. C. potentials; a second transformer having a primary winding and a secondary winding; a saturable reactor having an impedance winding and a saturating winding; the primary winding of said second transformer and the impedance winding of said saturable reactor being connected in a common circuit across said input; a load circuit connected to the secondary winding of said second transformer; and a rectifier connected between the secondary winding of said first transformer and said saturating winding for varying the degree of saturation of said saturable reactor whereby the power supplied to said load circuit varies in accordance with the modulation of the current in the primary winding of said first transformer.

7. In combination: a first transformer having a primary winding and a secondary winding arranged on an unsaturated ferromagnetic core; a resonant circuit having an input adapted for connection to a source of A. C. potentials, said resonant circuit including said primary winding and a condenser; a thermally variable impedance means operatively connected with said primary winding for modulating the current in the primary winding at a pulsation frequency lower than the frequency of said A. C. potentials; a plurality of second transformers, each having a primary winding and a secondary winding, the turns-ratio of the latter secondary and primary windings being high; a saturable reactor having an impedance winding and a saturating winding; the primary windings of said second transformers and the impedance winding of said saturable reactor being connected in a common circuit across said input; and a plurality of "neon-type" gaseous discharge device connected across the respective secondary windings of said second transformers; and a rectifier connected between the secondary winding of said first transformer and said saturating winding for varying the saturation of said saturable reactor whereby said gaseous discharge devices are periodically energized at the pulsation frequency in synchronism with the modulation of the current flowing in said resonant circuit.

8. In combination: a transformer having a primary winding and a secondary winding arranged on a ferromagnetic core; a resonant circuit having an input adapted for connection to a source of A. C. potentials, said resonant circuit including said primary winding and a condenser; thermally variable impedance means operatively connected with said primary winding for varying the inductance thereof whereby the current in the primary winding is modulated at a pulsation frequency lower than the frequency of said A. C. potentials; and a load circuit periodically energized at the pulsation frequency by the voltage induced in said secondary winding by the modulated current flowing in said primary winding.

9. In combination: a transformer having a primary winding and a secondary winding arranged on a ferromagnetic core; a resonant circuit having an input adapted for connection to a source of A. C. potentials, said resonant circuit including said primary winding and a condenser; thermally variable impedance means operatively connected with said primary winding for varying the inductance thereof whereby the current in the primary winding is modulated at a pulsation frequency lower than the frequency of said A. C. potentials; and a load circuit periodically energized at said pulsation frequency by the voltage induced in said secondary winding.

10. In combination: a transformer having a primary winding and a secondary winding arranged on a ferromagnetic core; a resonant circuit having an input adapted for connection to a source of A. C. potentials, said resonant circuit including said primary winding and a condenser; thermally variable impedance means operatively connected with said primary winding for varying the inductance thereof whereby the current in the primary winding is modulated at a pulsation frequency lower than the frequency of said A. C. potentials; and a "neon-type" gaseous discharge device periodically energized at said pulsation frequency by the voltage induced in said secondary winding by the current flowing in said primary winding.

HOMER A. ENGLE.

No references cited.